US006290239B1

(12) United States Patent
Yoshigi

(10) Patent No.: US 6,290,239 B1
(45) Date of Patent: Sep. 18, 2001

(54) SEAL CONSTRUCTION OF CONNECTOR

(75) Inventor: Toshimasa Yoshigi, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/422,340

(22) Filed: Oct. 21, 1999

(30) Foreign Application Priority Data

Oct. 23, 1998 (JP) ........................................ 10-302724

(51) Int. Cl.[7] ........................................ F16J 15/46
(52) U.S. Cl. ........................................ 277/645
(58) Field of Search ........................................ 277/316, 605, 277/645

(56) References Cited

U.S. PATENT DOCUMENTS 3,781,456 * 12/1973 Knowles et al. ................. 277/605 X
3,806,625 * 4/1974 Long ................................ 277/605 X
4,103,136 * 7/1978 Karakis et al. .................. 277/316 X

* cited by examiner

*Primary Examiner*—Robert J. Sandy
*Assistant Examiner*—Karlena D. Schwing
(74) *Attorney, Agent, or Firm*—Sughrue, Mion, Zinn, Macpeak & Seas, PLLC

(57) ABSTRACT

In a connector 1, a plurality of resin-filling regions, in which a plurality of terminals 3 are arranged, are separated from each other by a separation wall 4. The plurality of resin-filling regions are equal to each other in cross-sectional area in a direction perpendicular to axes of the terminals 3. The shortest widths of the plurality of resin-filling regions in a direction perpendicular to a direction of juxtaposition of the terminals 3 are equal to each other.

2 Claims, 6 Drawing Sheets

SEAL CONSTRUCTION OF CONNECTOR

BACKGROUND OF INVENTION

1. Field of the Invention

This invention relates to a seal construction of a connector, and more particularly to a seal construction of a relay connector for an automatic transmission.

2. Related art

A conventional art technique will be briefly described with reference to FIGS. 5 and 6.

FIG. 5 is a cross-sectional view of a conventional relay connector for an automatic transmission which connector has the function of preventing oil from leaking from an oil case to the exterior through a gap in a conductor portion (wire harness) of a cable.

A relay connector 51 is mounted in a through hole 53, formed through a wall 52 of an oil case of an automatic transmission through an O-ring 55, fitted in a groove 54 formed in an outer peripheral surface of the connector, and a flange 56. With respect to a seal construction of this relay connector, a partition wall 58 is formed within a hollow connector housing 57 in integral relation thereto, and is disposed perpendicularly to an axis C of the connector, and a plurality of terminals 59 (for transmitting electrical signals) are insert molded in the partition wall 58, and extend in the direction of the axis C of the connector housing 57 such that these terminals 59 are exposed to a gas phase side and an oil phase side. The gas phase-side chamber is divided into two regions A and B by a separation wall 70 which is disposed parallel to the axis C of the connector, and has a gouging prevention function.

In this relay connector 51, when the temperature of the oil phase side becomes high, the degree of intimate contact between the connector housing 57 and the electric terminals 59 is lowered because of the difference in thermal expansion coefficient between the two, which leads to a possibility that the oil leaks from the oil phase side to the gas phase side. Therefore, a filling material 60*a,* 60*b* (see FIG. 6), such as an epoxy resin, is filled in the gas phase-side chamber.

FIG. 6 is a cross-sectional view showing only the gas phase side, and showing a condition in which the filling material 60*a,* 60*b,* filled therein, is completely solidified.

However, in the above conventional seal construction of the relay connector 51 in which the plurality of resin-filling regions, in which the plurality of terminals are arranged, are separated from each other by the separation wall, a width Wa of the region A of the chamber in the relay connector 51 is larger than a width Wb of the region B (Wa>Wb), and therefore the region A and the region B are different in cross-sectional area from each other. Namely, if the resin-filling regions A and B have the same filling height, these regions are different in volume.

Usually, an epoxy resin, silicone or the like, used as the filling material 60*a,* 60*b,* has a high viscosity, and therefore in the filling operation, much time is required for the filling of the filling material, so that the filling material is solidified before it is filled uniformly over the entire area.

If the filling regions are different in cross-sectional area (volume), the conditions of the solidified filling material in the two regions are different from each other, and the filling material flows at higher speed (that is, at higher filling rate) in the larger region A than in the narrower region B, and is solidified earlier. Therefore, the height of the filled resin in the narrower region B, in which the filling material is filled at lower speed, is larger than that in the larger region A. As a result, the excess filling material adheres in an irregular manner to the terminals and seal surfaces and so on in the narrower region B.

Therefore, the reliability of the connector is lowered by the degraded electrical performance of the terminals, and in addition, the filling material is wasted.

SUMMARY OF INVENTION

This invention has been made in view of the above problems of the conventional seal construction of the connector, and an object of the invention is to provide a seal construction of a connector in which good reliability is achieved, and a filling material can be saved, and the efficiency of a filling operation is high.

The above object of the invention has been achieved by a seal construction of a connector in which a plurality of resin-filling regions, in which a plurality of terminals are arranged, are separated from each other by a separation wall; wherein the plurality of resin-filling regions are equal to each other in cross-sectional area in a direction perpendicular to axes of the terminals.

In the connector seal construction of the invention, preferably, the shortest widths of the plurality of resin-filling regions in a direction perpendicular to a direction of juxtaposition of the terminals are equal to each other.

In the present invention, the plurality of resin-filling regions are equal to each other in cross-sectional area in the direction perpendicular to the axes of the terminals, and with this construction, the filling materials, filled respectively in the resin-filling regions, can have generally the same thickness.

The shortest widths of the plurality of resin-filling regions in the direction perpendicular to the direction of juxtaposition of the terminals are equal to each other, and with this construction the filling materials, filled respectively in the region filling regions, are prevented from flowing differently from each other.

DETAILED DESCRIPTION OF PREFERRED EMBODIMENTS

One preferred embodiment of a seal construction of the present invention for a connector will now be described in detail with reference to the drawings.

Figure 1:
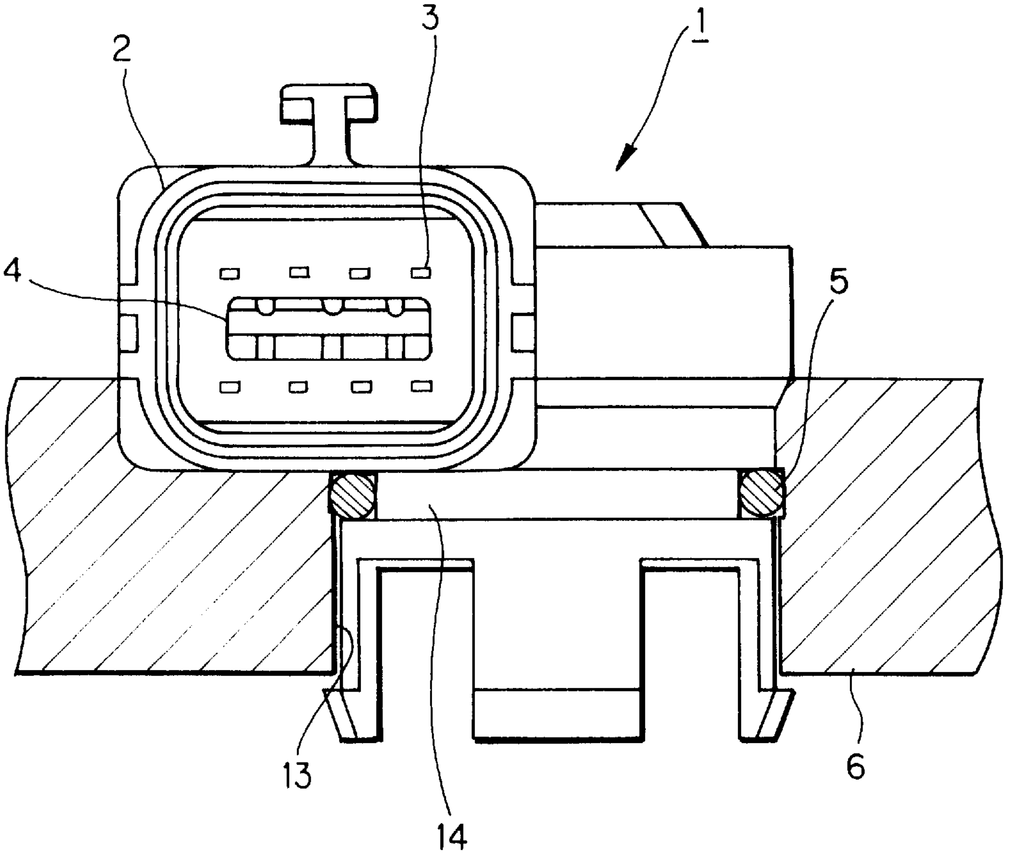
FIG. 1 is a partly-broken, cross-sectional view showing a connector seal construction of the present invention used in a relay connector for an automatic transmission of an automobile.
Figure 2:
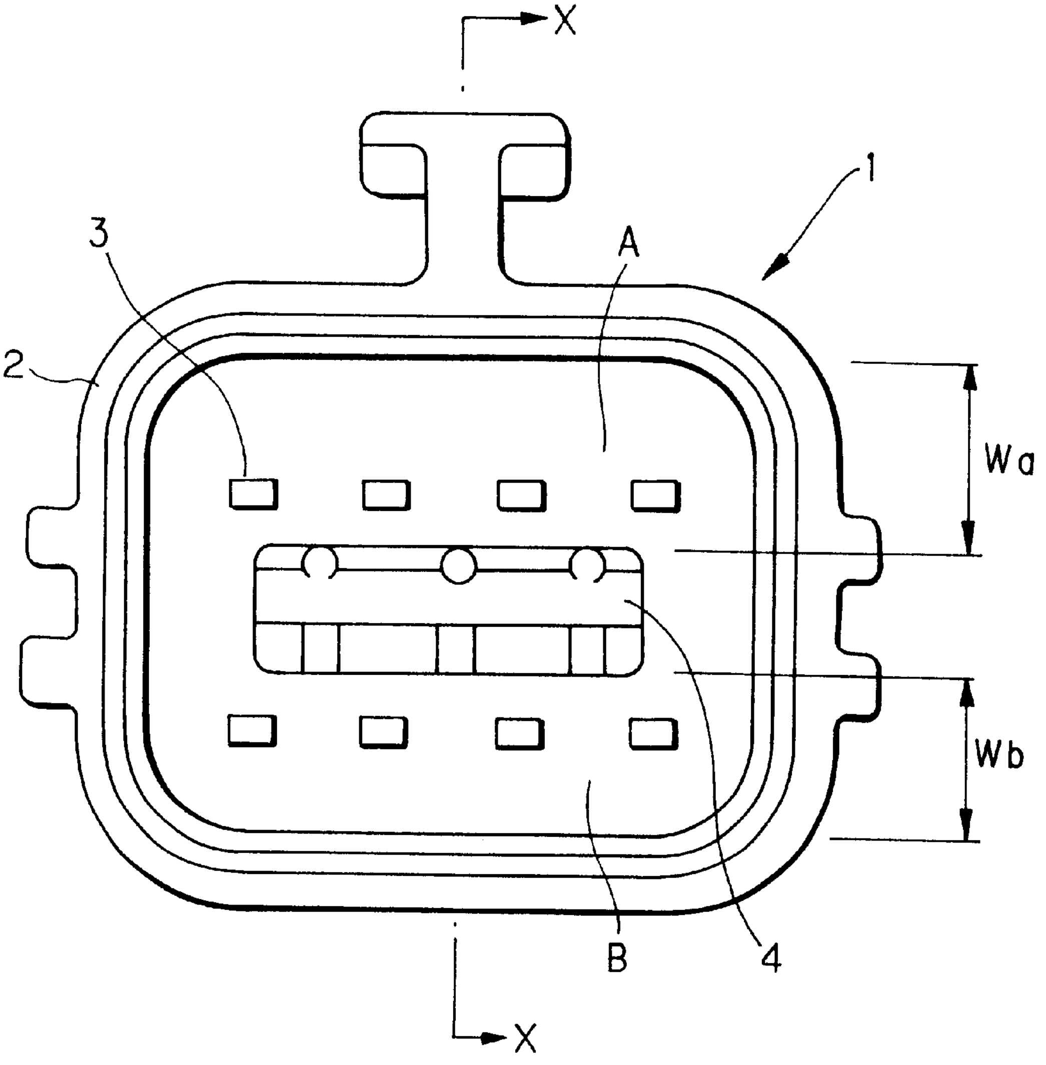
FIG. 2 is a top plan view showing the interior of a connector housing of the connector of FIG. 1.
Figure 3:
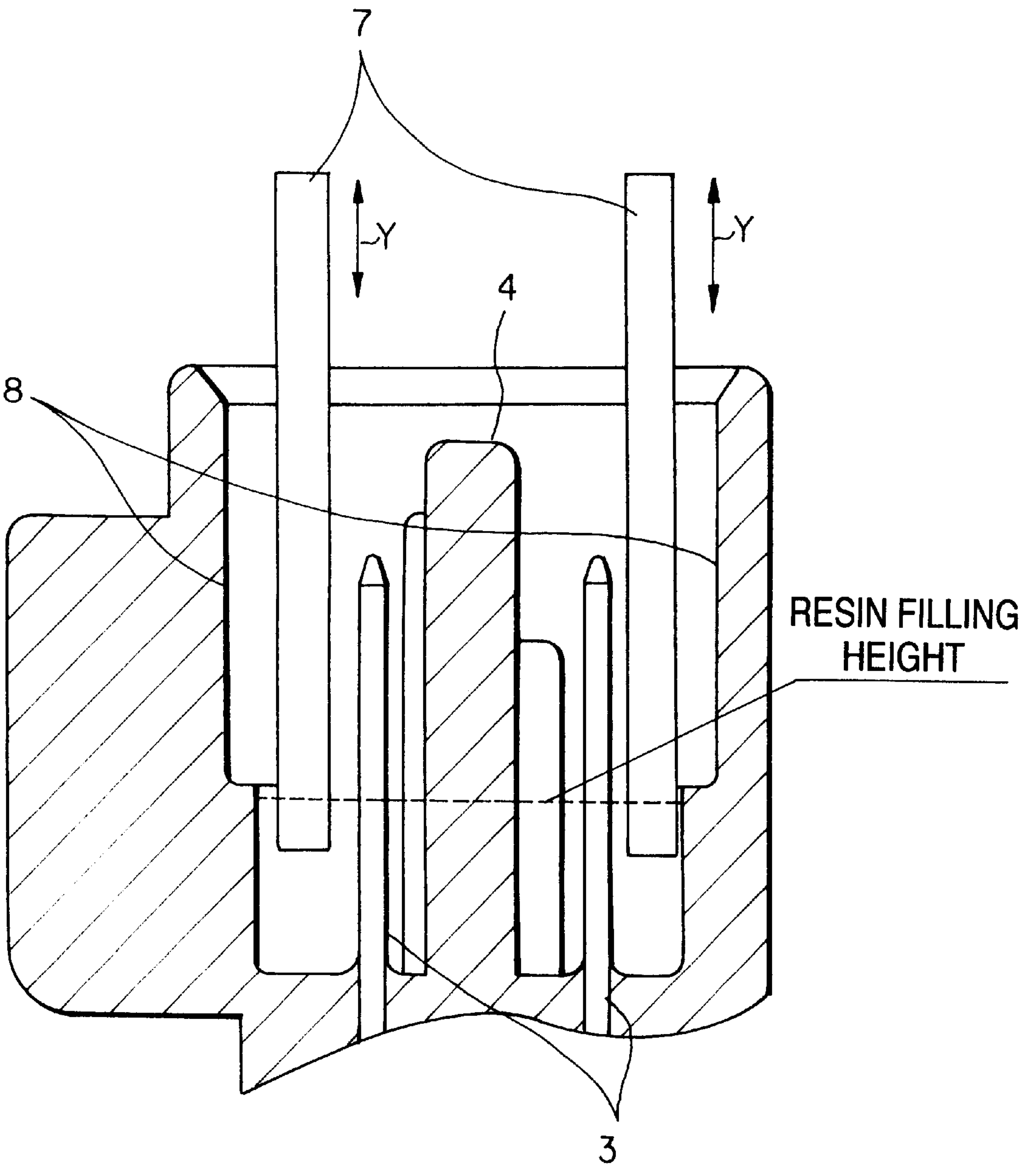
FIG. 3 is a cross-sectional view taken along the line X—X of FIG. 2, showing a condition before a filling material is filled in the connector.
Figure 4:
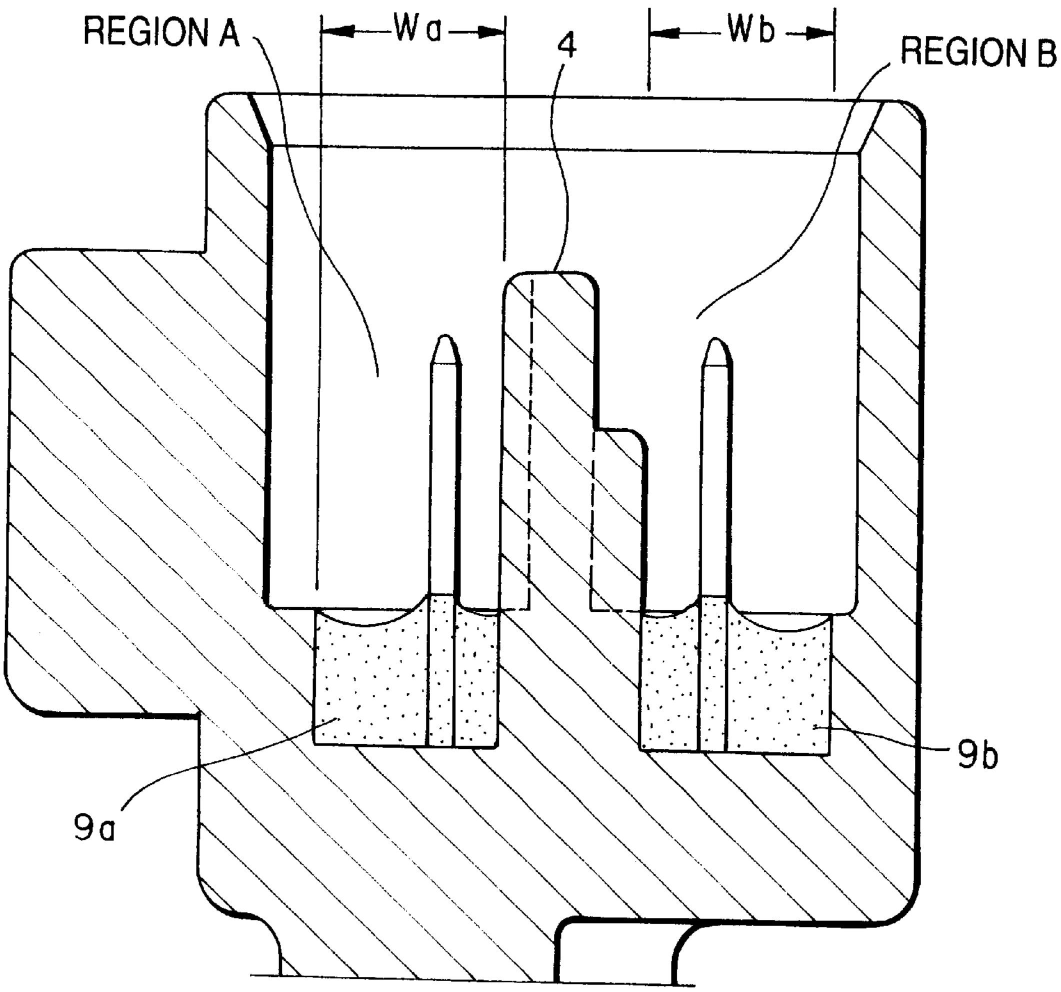
FIG. 4 is a cross-sectional view taken along the line X—X of FIG. 2, showing a condition after the filling material is filled in the connector.
Figure 5:
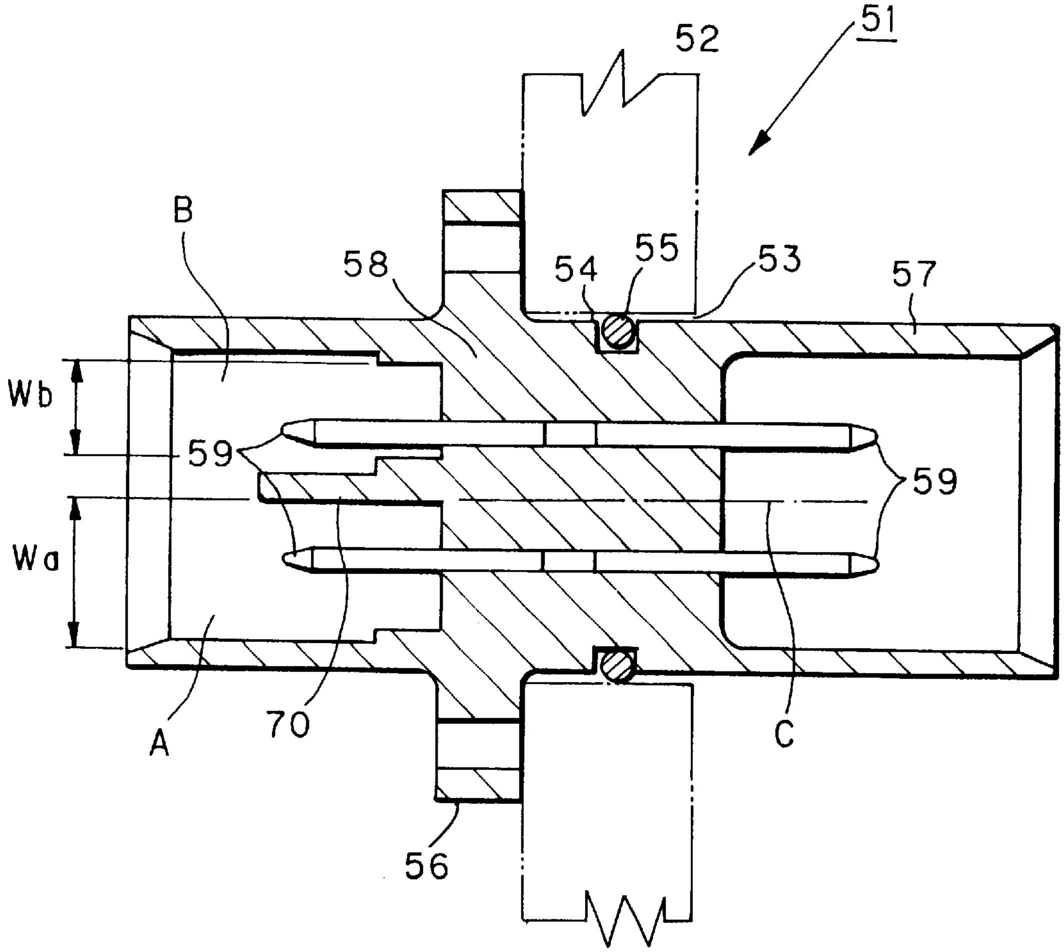
FIG. 5 PRIOR ART
FIG. 5 is a cross-sectional view of a conventional relay connector for an automatic transmission.
Figure 6:
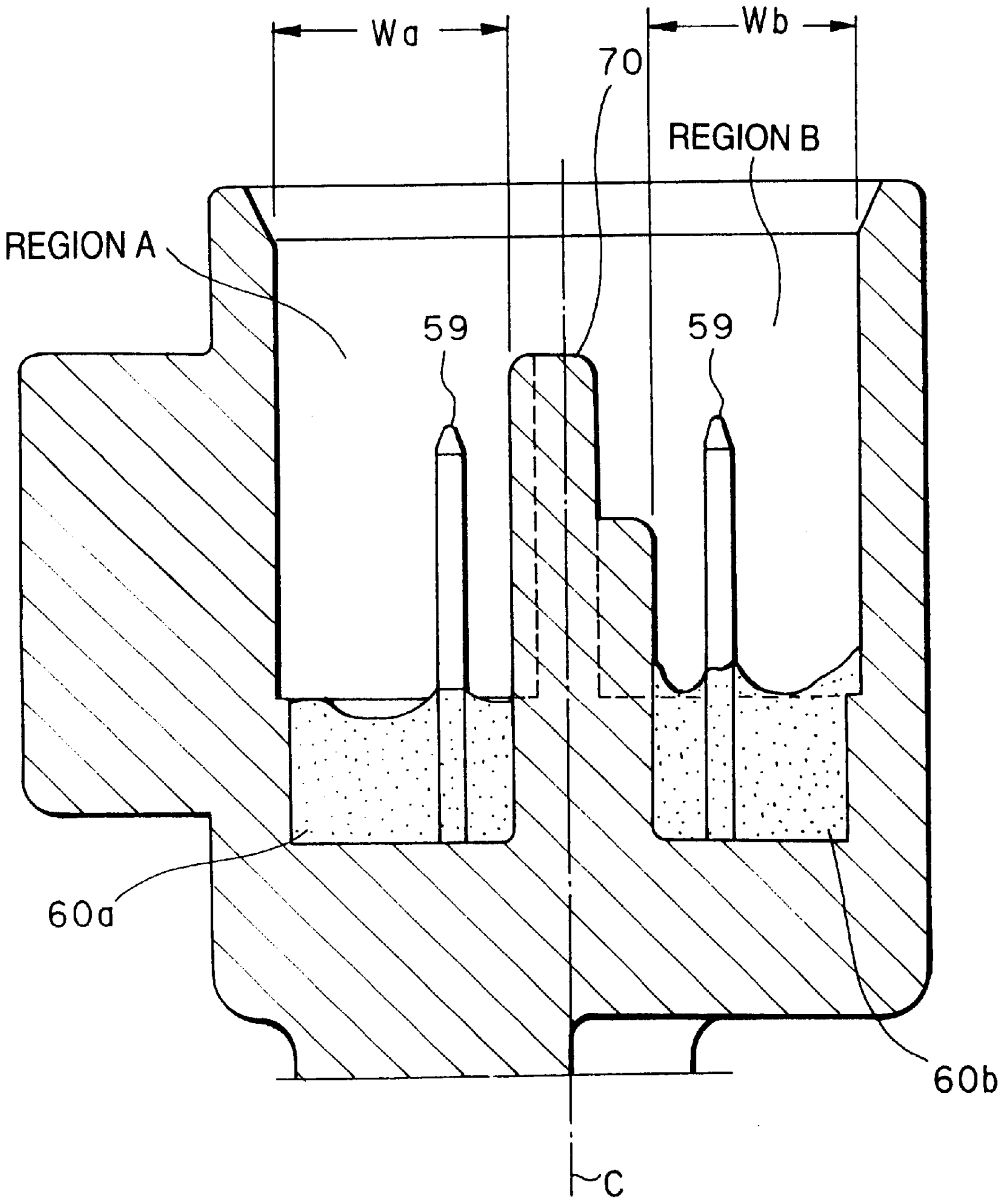
FIG. 6 PRIOR ART
FIG. 6 is a cross-sectional view showing a condition after a filling material is filled in the conventional relay connector for the automatic transmission.

FIG. 1 is a partly-broken, cross-sectional view showing the connector seal construction of the invention used in a relay connector for an automatic transmission of an automobile, FIG. 2 is a top plan view showing the interior of a connector housing of the connector of FIG. 1, FIG. 3 is a cross-sectional view taken along the line X—X of FIG. 2, showing a condition before a filling material is filled in the connector, and FIG. 4 is a cross-sectional view taken along the line X—X of FIG. 2, showing a condition after the filling material is filled in the connector.

In the relay connector 1 of this embodiment, a plurality of resin-filling regions, in which a plurality of terminals 3 are arranged, are separated from each other by a separation wall 4.

The plurality of resin-filling regions are equal to each other in cross-sectional area in a direction perpendicular to the axes of the terminals. Namely, inlet openings of the resin-filling regions (that is, the areas of the resin-filling regions as viewed from the open end of the connector) are equal to each other.

The shortest widths (Wa and Wb) of the resin-filling regions in a direction perpendicular to the direction of juxtaposition of the terminals 3 are equal to each other.

In this embodiment, the connector seal construction is applied to the relay connector for the automatic transmission of an automobile, and FIG. 1 is a partly-broken, cross-sectional view showing the relay connector 1 for the automatic transmission of an automobile from the top of the gas phase side.

This relay connector 1 is mounted in a through hole 13, formed through an automatic transmission body 6, through an O-ring 5 fitted in a groove 14 formed in an outer peripheral surface of the connector. The terminals 3 for transmitting electrical signals to a mating connector are arranged within the hollow connector housing 2 of the relay connector 1, and the separation wall 4 is formed within the connector housing 2 at a central portion thereof, and this separation wall 4 has the function of preventing the gouging when this connector is connected to the mating connector.

Next, the internal structure of the connector housing 2 will be described in detail with reference to FIG. 2.

Within the connector housing 2, two rows of terminals 3 are arranged parallel to each other, with the separation wall 4 disposed therebetween, each row having four terminals 3. Spaces are formed at opposite ends of the separation wall 4, respectively.

The width Wa of the upper (FIG. 2) resin-filling region (potting region) A is equal to the width Wb of the lower resin-filling region B.

FIG. 3 is a cross-sectional view taken along the line X—X of FIG. 2, showing a condition before the filling material is filled in the relay connector 1, and filling nozzles (dispenser nozzles) 7 are inserted respectively in the region A (lying between a seal surface 8 and the separation wall 4) and the region B (lying between a seal surface 8, opposed to the first-mentioned seal surface 8, and the separation wall 4).

FIG. 4 is a cross-sectional view taken along the line X—X of FIG. 2, showing a condition after the filling material is filled in the relay connector 1, and the filling materials 9*a* and 9*b*, filled respectively in the regions A and B, are solidified.

Next, a method of filling the filling material in the relay connector 1 will be described in detail.

For example, an epoxy resin, silicone or the like, having a viscosity of not less than 3,000 CPS, is used as the filling material. Because of this viscosity, it takes time (time lag) before the filling material is filled in the filling uniformly over the entire area thereof. The plurality of terminals, provided in each resin-filling region, offer the resistance to flow of the filling material, and the larger the area, occupied by the terminals, the larger the time lag.

The terminals 3, existing in the region A, is equal in number to the terminal 3 existing in the region B, and therefore the area, occupied by the terminals in the region A, is equal to the area occupied by the terminals in the region B, and also the width Wa of the region A is equal to the width Wb of the region B, and therefore the time lag in the region A is equal to the time lag in the region B.

As shown in FIG. 3 (which is the cross-sectional view), the filling nozzles 7 are inserted in the region A and the region B, respectively, and the filling materials of the same amount are simultaneously filled respectively in the regions A and B to a predetermined liquid level.

After this filling operation is finished, the filling nozzles 7 are removed, and the filling materials are allowed to solidify. Then, the filling materials are solidified, and FIG. 4 (which is the cross-sectional view) shows this condition. The upper surfaces of the solidified filling materials 9*a* and 9*b* have generally the same height, and any excess filling material will not adhere to the seal surfaces and others.

In the above embodiment, although the number of the terminals is eight (8), and the number of the filling regions is two (2), similar effects can be obtained even if the number of the terminals is other than 8, and the resin-filling regions is more than 2.

As described above, in the connector seal construction of the present invention, the plurality of resin-filling regions, in which the plurality of terminals are arranged, are separated from each other by the separation wall, and the plurality of resin-filling regions are equal to each other in cross-sectional area in the direction perpendicular to the axes of the terminals. And besides, the shortest widths of the plurality of resin-filling regions in the direction perpendicular to the direction of juxtaposition of the terminals are equal to each other. Therefore, the surfaces of the filling materials, filled respectively in the resin-filling regions, can have generally the same height, and the filling material will not adhere to the terminals, the seal surfaces and others.

As a result, the reliability of the connector is enhanced, and the efficiency of the filling operation is enhanced, and the filling material can be saved, and therefore the production cost can be reduced.

What is claimed is:

1. A seal construction of a connector comprising:

a connector housing;

a plurality of terminals accommodated in said housing;

a plurality of resin-filling regions, in which a plurality of terminals are arranged, separated from each other by a separation wall, said plurality of resin-filling regions being equal to each other in cross-sectional area in a direction perpendicular to axes of said plurality of terminals.

2. A seal construction of a connector according to claim 1, in which the shortest widths of said plurality of resin-filling regions in a direction perpendicular to a direction of juxtaposition of said terminals are equal to each other.

* * * * *